(12) United States Patent
Carr et al.

(10) Patent No.: US 9,517,952 B2
(45) Date of Patent: Dec. 13, 2016

(54) HYDROPHILIC-OLEOPHOBIC COPOLYMER COMPOSITION AND USES THEREOF

(71) Applicant: General Electric Company, Schenectady, NY (US)

(72) Inventors: Louisa Ruth Carr, Schenectady, NY (US); James Manio Silva, Clifton Park, NY (US); Paul Michael Smigelski, Jr., Glenville, NY (US); Jason Nichols, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 325 days.

(21) Appl. No.: 14/080,878

(22) Filed: Nov. 15, 2013

(65) Prior Publication Data

US 2015/0136712 A1    May 21, 2015

(51) Int. Cl.
| | | |
|---|---|---|
| *C02F 1/44* | (2006.01) | |
| *B01D 61/00* | (2006.01) | |
| *B01D 29/46* | (2006.01) | |
| *C08F 220/24* | (2006.01) | |
| *C08F 220/38* | (2006.01) | |

(Continued)

(52) U.S. Cl.
CPC ............... *C02F 1/444* (2013.01); *C02F 1/58* (2013.01); *C08F 220/24* (2013.01); *C08F 220/38* (2013.01); *C02F 2101/32* (2013.01); *C02F 2303/20* (2013.01); *C02F 2305/00* (2013.01); *C08F 2220/387* (2013.01)

(58) Field of Classification Search
CPC ......... C02F 1/44; C02F 1/441; C02F 2303/20; B01D 67/0093; B01D 69/125; B01D 69/12; B01D 71/80; B01D 69/10; B01D 61/145; B01D 61/147
See application file for complete search history.

(56) References Cited

U.S. PATENT DOCUMENTS

| | | | |
|---|---|---|---|
| 3,574,791 A | | 4/1971 | Sherman et al. |
| 4,227,344 A | * | 10/1980 | Poppke .................. E01F 13/06 49/147 |

(Continued)

FOREIGN PATENT DOCUMENTS

| | | |
|---|---|---|
| CN | 101519473 A | 9/2009 |
| EP | 2229414 B1 | 8/2012 |

(Continued)

OTHER PUBLICATIONS

Arthur et al., "Technical Summary of Oil & Gas Produced Water Treatment Technologies", ALL Consulting LLC, Mar. 2005, 53 Pages.

(Continued)

*Primary Examiner* — Ana Fortuna
(74) *Attorney, Agent, or Firm* — Mary Louise Stanford

(57) ABSTRACT

Provided herein are copolymers and copolymer compositions that are both hydrophilic and oleophobic. The copolymers include structural units derived from a fluoroalkyl monomer and a zwitterionic monomer. It further relates to membranes formed by coating a porous substrate with the copolymeric compositions. The copolymeric coating imparts hydrophilicity and oleophobicity/oil-tolerance to the membranes. The uses of such membranes as microfiltration membrane or ultrafiltration membrane are also provided.

11 Claims, 3 Drawing Sheets

(51) Int. Cl.
*C02F 1/58* (2006.01)
*C02F 101/32* (2006.01)

(56) References Cited

U.S. PATENT DOCUMENTS

| | | | |
|---|---|---|---|
| 5,250,185 A * | 10/1993 | Tao | B01D 61/025 |
| | | | 210/500.38 |
| 6,284,854 B1 | 9/2001 | Bowers et al. | |
| 6,355,081 B1 | 3/2002 | Wang et al. | |
| 6,521,012 B2 | 2/2003 | Lamon et al. | |
| 6,579,342 B2 | 6/2003 | Wang et al. | |
| 6,617,267 B2 | 9/2003 | Soane et al. | |
| 6,924,338 B1 | 8/2005 | Davies et al. | |
| 7,584,860 B2 | 9/2009 | Olson | |
| 7,771,818 B2 | 8/2010 | Klare et al. | |
| 9,011,831 B2 * | 4/2015 | Ding | A61L 31/10 |
| | | | 424/423 |
| 2002/0155771 A1 | 10/2002 | Soane et al. | |
| 2009/0283611 A1 | 11/2009 | Varanasi et al. | |
| 2011/0171458 A1 | 7/2011 | Burger et al. | |
| 2011/0182951 A1 | 7/2011 | Burger et al. | |
| 2012/0000853 A1 | 1/2012 | Tuteja et al. | |
| 2012/0048800 A1 | 3/2012 | Farzana et al. | |
| 2012/0181019 A1 | 7/2012 | Saini et al. | |
| 2012/0181033 A1 | 7/2012 | Saini et al. | |
| 2013/0022876 A1 | 1/2013 | Stokes et al. | |
| 2013/0034702 A1 | 2/2013 | Bockmeyer et al. | |
| 2015/0136712 A1 * | 5/2015 | Carr | C02F 1/58 |
| | | | 210/799 |

FOREIGN PATENT DOCUMENTS

| | | |
|---|---|---|
| GB | 2453200 A | 4/2009 |
| WO | 9949124 A2 | 9/1999 |
| WO | 2011159699 A2 | 12/2011 |

OTHER PUBLICATIONS

Chakrabarty et al., "Ultrafiltration of Stable Oil-in-water Emulsion by Polysulfone Membrane", Journal of Membrane Science, vol. 325, Issue 1, pp. 427-437, Nov. 15, 2008.

Youngblood et al., "Amphiphile Grafted Membranes for the Separation of Oil-in-water Dispersions", Journal of Colloid and Interface Science, vol. 329, Issue 1, pp. 127-132, Jan. 1, 2009.

Han et al., "Superhydrophobic and Oleophobic Fibers by Coaxial Electrospinning", Langmuir, vol. 25, Issue 16, pp. 9454-9462, Apr. 20, 2009.

Chen et al., "Engineering a Robust, Versatile Amphiphilic Membrane Surface Through Forced Surface Segregation for Ultralow Flux-Decline", Advanced Functional Materials, vol. 21, Issue 1, pp. 191-198, Jan. 7, 2011.

Kota et al., "Hygro-responsive Membranes for Effective Oil-water Separation", Nature Communications, vol. 3, Aug. 28, 2012, 27 Pages.

"BHS Candle Filter Applications for Clarification/Recovery of Solids from Chemical Slurries", BHS-Filtration Inc., 12 Pages.

International Search Report and Written Opinion issued in connection with corresponding PCT Application No. PCT/US2014/059828 dated Mar. 26, 2015.

* cited by examiner

HYDROPHILIC-OLEOPHOBIC COPOLYMER COMPOSITION AND USES THEREOF

FIELD OF INVENTION

The disclosure generally relates to copolymers and copolymer compositions that are both hydrophilic and oleophobic. It further relates to membranes coated with such copolymer compositions to impart both hydrophilicity and oleophobicity to the membranes and their uses, for example, as filtration membranes for treatment of hydrocarbon-containing water.

BACKGROUND

Efficient removal of oily suspended solids (e.g., oil-coated dirt particles) from water is one of the major challenges in water-treatment industry. For example, large-scale methods for treatment of hydrocarbon-containing waste water (e.g., oil-containing water) in a petroleum industry may range from giant containment booms and absorbent skimmers to chemical treatments. Produced water from unconventional gas production are often disposed of by underground injection. Prior to its disposal, the produced water is treated with significant levels of biocide to prevent fouling of the disposal well. Some of these conventional water-treatment techniques have questionable effects on human health and environment.

Filtration methods could provide a more efficient and scalable approach for treatment of hydrocarbon-containing water and to remove oily suspended particles. Microbial removal by microfiltration has potential to be a lower cost option than biocide treatment. However, for microfiltration to be less expensive than biocide treatment, the microfilter must be hydrophilic and not be fouled by oils present in the produced water. Ceramic membranes that are oil-tolerant have been employed for treatment of oil-containing water. However, ceramic membranes have significant disadvantages in terms of their higher weight and production costs. Further, ceramic membranes have significant limitations in application areas where oily suspended solids are to be removed from contaminated water.

Polymeric membranes are suitable candidates for water treatment processes. Polymeric membranes are cheaper in comparison with their ceramic counter parts and are also more compact. The use of polymeric membranes for treating water reduces the operating cost and size of water-treatment plants employing the same. However, one of the major drawbacks of polymeric membranes is membrane fouling. Generally, membrane fouling occurs when impurities in water such as emulsified, free, or dissolved oil are irreversibly deposited on the membrane surface and/or within the internal pores of the membrane. These deposits not only decrease the membrane lifetime but also lead to a dramatic reduction in water flux, subsequently leading to an increased operating costs. Additionally, if a polymeric membrane is not hydrophilic in nature, aqueous dispersions such as oil-containing waste water cannot be readily filtered through these membranes without pre-wetting the membrane with organic solvents such as isopropanol followed by flushing with water to overcome the lack of affinity between the non-hydrophilic material and the polar aqueous dispersion. Such pre-wetting of membranes may be expensive and may also lead to "gas-lock" or "de-wetting".

In view of the above, there remains a need for development of hydrophilic polymeric membranes that are both oleophobic and oil-tolerant so as to enable their use in treatment of hydrocarbon-contaminated water without being rapidly fouled by hydrocarbons.

BRIEF DESCRIPTION OF THE INVENTION

The invention is directed to copolymers and copolymeric compositions that are both hydrophilic and oleophobic. Membranes comprising such copolymeric compositions, which are both hydrophilic and oleophobic and/or oil-tolerant are also provided.

In some embodiments, a copolymer comprising 1 to 50 mole % of a structural unit of formula I and 25 to 99 mole % of a structural unit of formula II are provided.

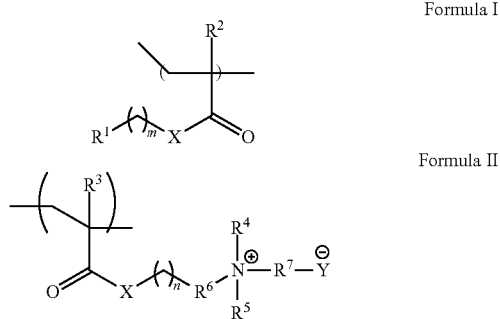

Formula I

Formula II

In formulas I and/or II, $R^1$ is a linear or branched $C_1$-$C_{30}$ fluoroalkyl group. $R^2$ and $R^3$ are independently at each occurrence a hydrogen, or a linear or branched $C_1$-$C_4$ alkyl group. In some embodiments, $R^4$ and $R^5$ are independently at each occurrence a linear or branched $C_1$-$C_{12}$ alkyl group, a $C_5$-$C_{12}$ carbocyclic group, or a $C_5$-$C_{12}$ heterocyclic group; and $R^6$ and $R^7$ are independently at each occurrence a linear or branched $C_1$-$C_{12}$ alkylene group, a linear or branched $C_2$-$C_{12}$ alkenylene group, a linear or branched $C_2$-$C_{12}$ alkynlene group, a $C_5$-$C_{12}$ carbocyclic group, or a $C_5$-$C_{12}$ heterocyclic group. In some other embodiments, at least two of $R^4$, $R^5$, $R^6$, or $R^7$ together with the nitrogen atom to which they are attached may form a heterocyclic ring containing 5 to 7 atoms. X is independently at each occurrence either an oxygen atom (—O—) or an —NH— group; and Y is either a sulfite group or a carboxylate group. The values of m and n are independently at each occurrence an integer ranging from 1 to 5.

In some embodiments, a copolymer comprising structural units derived from a mixture of ethylenically unsaturated monomers comprising 1 to 50 mole % of fluoroalkyl monomer of formula III and 25 to 99 mole % of zwitterionic monomer of formula IV is provided.

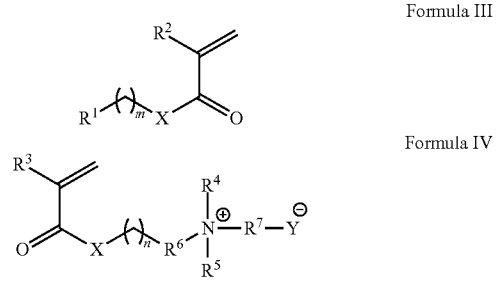

Formula III

Formula IV

In formulas II and/or IV, $R^1$ is a linear or branched $C_1$-$C_{30}$ fluoroalkyl group. $R^2$ and $R^3$ are independently at each occurrence a hydrogen, or a linear or branched $C_1$-$C_4$ alkyl group. In some embodiments, in formula IV, $R^4$ and $R^5$ are independently at each occurrence a linear or branched $C_1$-$C_{12}$ alkyl group; a $C_5$-$C_{12}$ carbocyclic group, or a $C_5$-$C_{12}$ heterocyclic group; and $R^6$ and $R^7$ are independently at each occurrence a linear or branched $C_1$-$C_{12}$ alkylene group, a linear or branched $C_2$-$C_{12}$ alkenylene group, a linear or branched $C_2$-$C_{12}$ alkylnlene group, a $C_5$-$C_{12}$ carbocyclic group, or a $C_5$-$C_{12}$ heterocyclic group. In some other embodiments, at least two of $R^4$, $R^5$, $R^6$, or $R^7$ of formula IV together with the nitrogen atom to which they are attached form a heterocyclic ring containing 5 to 7 atoms. X is independently at each occurrence either an oxygen atom (—O—) or an —NH— group; and Y is an anionic group. The values of m and n are independently at each occurrence an integer ranging from 1 to 5.

In some embodiments, a composition comprising any of the above-disclosed copolymers is provided. In some embodiments, the copolymer comprises 1 to 50 mole % of a structural unit of formula VII, and 25 to 99 mole % of a structural unit of formula VIII, wherein $R^1$ is a linear $C_5$-$C_8$ fluoroalkyl group.

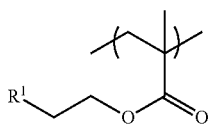

Formula VII

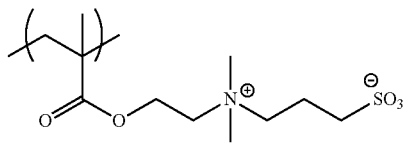

Formula VIII

In some embodiments, a membrane comprising a porous substrate and optionally a coating attached to the porous substrate is provided, wherein at least one of the porous substrate or the coating comprises any of the above-disclosed copolymers or copolymeric compositions. In some embodiments, the polymeric composition comprises a copolymer comprising 1 to 50 mole % of a structural unit of formula VI, and 25 to 99 mole % of a structural unit of formula VII, wherein $R^1$ is a linear $C_5$-$C_8$ fluoroalkyl group.

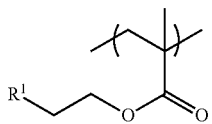

Formula VII

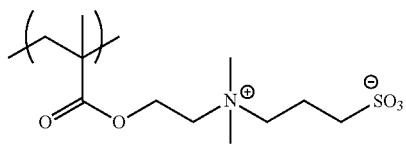

Formula VIII

DRAWINGS

These and other features, aspects, and advantages of the present invention will become better understood when the following detailed description is read with reference to the accompanying drawings.

DETAILED DESCRIPTION

Figure 1:
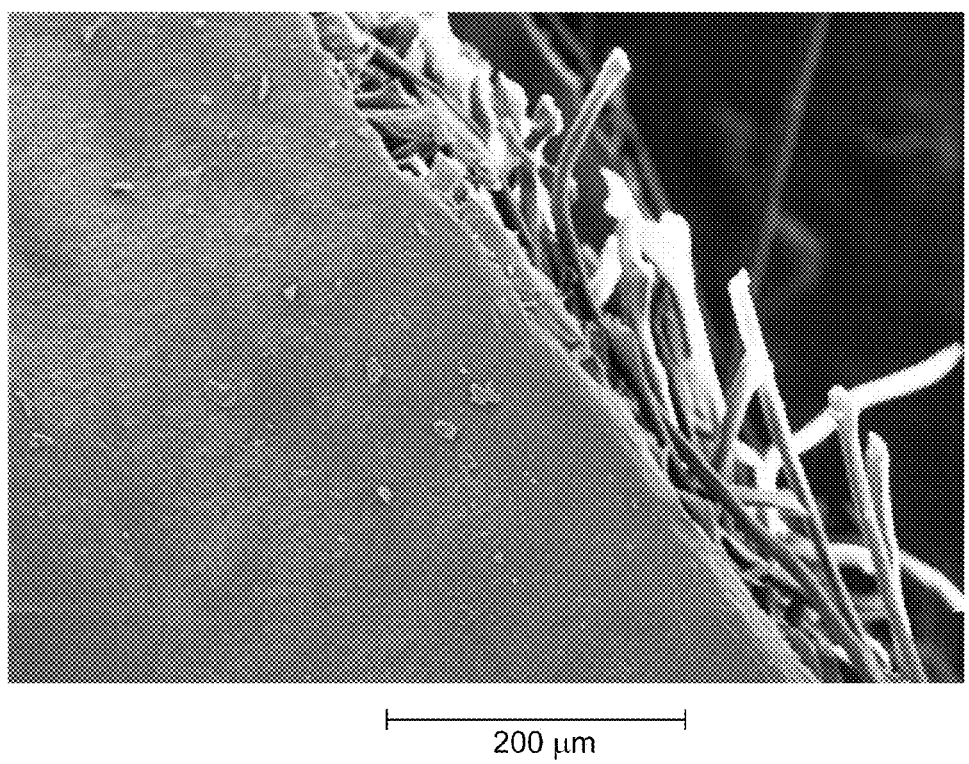
FIG. 1 shows a transmission electron microscopic (TEM) picture of z90 copolymer-coated ePTFE/PTFE membrane.
Figure 2:
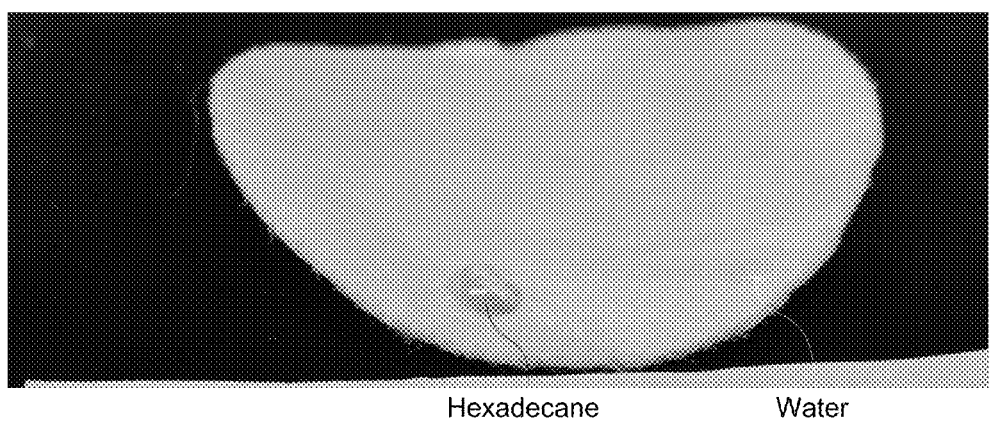
FIG. 2 shows contact angles of a hydrocarbon and water on an ePTFE/PTFE membrane coated with z90 copolymer.
Figure 3:
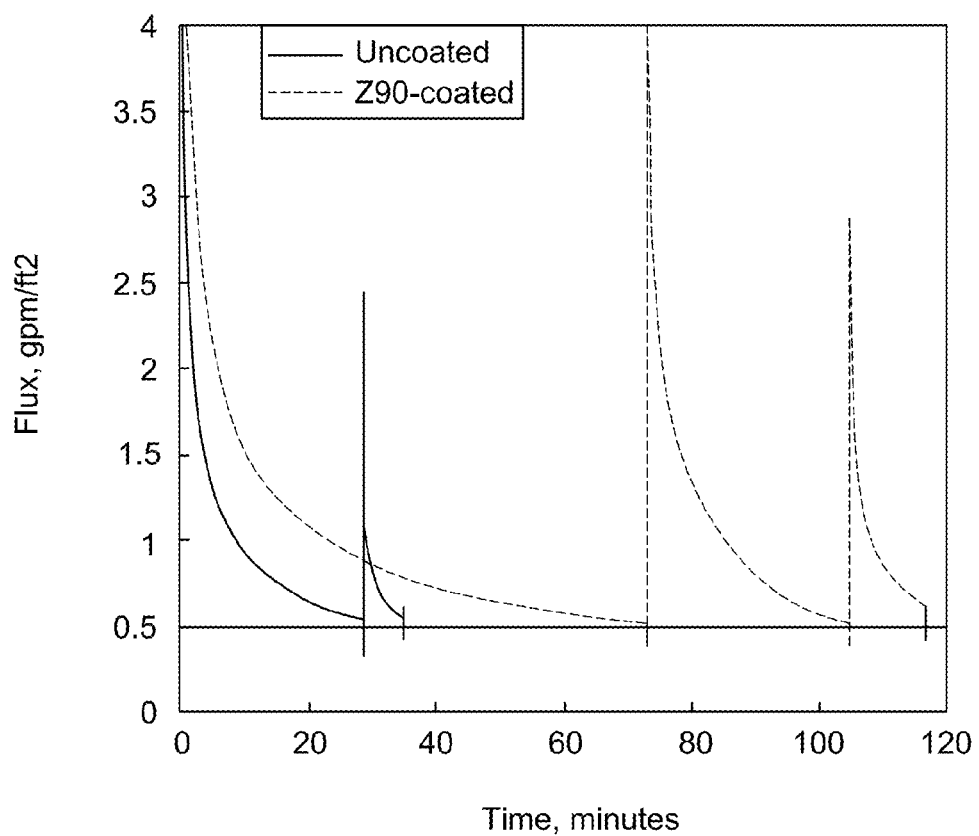
FIG. 3 illustrates the measured flux characteristics of a z90 copolymer-coated ePTFE/PTFE membrane in comparison with an ePTFE/PTFE membrane without any copolymer coating.

The invention is directed to hydrophilic-oleophobic copolymers and membranes formed therefrom. It further relates to the uses of copolymeric compositions as coating materials on porous substrates to form filtration membranes having both hydrophilic and oleophobic properties. By incorporating both hydrophilicity and oleophobicity to a filtration membrane, such coating enables efficient filtration of hydrocarbon-contaminated water, for example, filtration of produced water to remove suspended oily particles. In absence of such coatings, hydrocarbons (e.g., as emulsified, dissolved, or free oil in produced water) may rapidly foul a filtration membrane. Oleophobicity and oil-tolerance imparted by such copolymer coating may prevent oil in the contaminated water from wetting the membrane, occluding its pores, and stopping the filtration. Further, enhanced hydrophilicity may allow passage of water through these filtration membranes without the need for prior pre-wetting the filtration membrane with solvents such as isopropanol. Thus the filtration membrane having such coatings may be effectively used for treatment of contaminated water (hydrocarbon-containing water) with less frequent cleaning requirements. Such filtration membranes also obviate the need of chemical treatment facilities, and in turn reduce the need of usage, handling and storage of environmentally harmful toxic chemicals (e.g. biocides and solvents) in field operations.

To more clearly and concisely describe and point out the subject matter of the claimed invention, the following definitions are provided for specific terms, which are used in the following description and the appended claims.

As used herein, the term "acyclic" refers to a compound/group which does not contain a ring. The term acyclic atom refers to an atom which is not a ring member.

As used herein, the term "alicyclic" refers to a compound/group that contains non-aromatic ring(s). Alicyclic system includes polycyclic ring systems, which does not have an aromatic ring (e.g., benzene) as one of the cyclos. The term "cyclo" denotes a ring of a polycyclic ring system. As used herein the term "aromatic" refers to a compound/group having at least one aromatic ring. It also includes polycyclic ring system having at least one aromatic ring (e.g., a benzene ring) as one of the cyclos. Ring systems in general include substituted rings, including substitution in the form of additional fused or bridged ring(s).

As used herein, the term "alkyl group" refers to an acyclic carbon or a saturated acyclic carbon chain represented by the formula, —$C_nH_{2n+1}$.

As used herein, the term "alkylene group" refers an acyclic carbon or a saturated acyclic carbon chain represented by the formula, —$(C_nH_{2n})$—.

As used herein, the term "alkenyl group" refers to an acyclic carbon chain that contains a carbon-to-carbon double bond, and is represented by the formula, —$C_nH_{2n-1}$.

As used herein, the term alkenylene group refers to an acyclic carbon chain that contains a carbon-to-carbon double bond, and is represented by the formula, —$(C_nH_{2n-2})$—.

As used herein, the term "alkynyl group" refers to an acyclic carbon chain that contains a carbon-to-carbon triple bond, and is represented by the formula, —$C_nH_{2n-3}$.

As used herein, the term "alkynlene group" refers to an acyclic carbon chain that contains a carbon-to-carbon triple bond, and is represented by the formula, —$(C_nH_{2n-4})$—.

As used herein, the term "fluoroalkyl group" refers to an alkyl group wherein at least one of the hydrogen atoms of the alkyl group is substituted by a fluorine atom. The fluoroalkyl group includes, but not limited to, a perfluorinated alkyl group, wherein all hydrogen atoms of an alkyl group are substituted with fluorine atoms.

As used herein, the term "carbocyclic group" refers to chemical moieties comprising at least one carbocyclic ring. The term "carbocyclic ring" denotes a ring or ring system where all the ring members are carbons. The carbocyclic groups may be an alicyclic group (e.g., cycloalkyl groups such as cyclohexane group or cyclopentane group) or an aromatic group (e.g., a benzyl group, a benzene group, a naphthalene group or an anthracene group). The carbocyclic groups may be substituted or un-substituted.

As used herein, the term "heterocyclic group" refers chemical units comprising at least one hetero ring. The term "hetero ring" denotes a ring having carbon and at least one atom from the group consisting of nitrogen, oxygen, sulfur, selenium and tellurium as ring members, and contains no other element as a ring member. To qualify as hetero ring, non-ionic bonding must exist between all ring members. Inner salt compounds such as betaines, sufobetaines etc., wherein two ring members are attached to each other by ionic bonding are not regarded as hetero rings. The heterocyclic groups/rings may be alicyclic (e.g., a piperidine group) or aromatic (e.g., a pyrrole group, a pyridine group). The heterocyclic groups/rings may be substituted (e.g., 2-methylpyridine group) or un-substituted.

As used herein, a coated membrane is referred as "oil-tolerant" if the performance of the coated membrane in an oil-containing feed is the same (or within acceptable operable limits) as the performance of an uncoated membrane in an oil-free feed stream. For example, the performance/behavior of an oil-tolerant system may not change dramatically when oil is introduced into the system. For example, with an oil-tolerant coated membrane, flux of clean water or brine may be high, but flux through an uncoated membrane may degrade rapidly when the feed contains oil.

As used herein, a material with a measured contact angle of water or brine <20° is referred to be hydrophilic, while a material with a measured contact angle of hexane or hexadecane >60° is referred to be oleophobic.

In some embodiments, a copolymer comprising structural units having formula I and formula II are provided.

Formula I

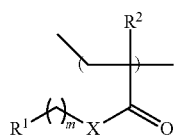

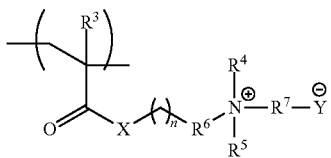

Formula II

In formula I, $R^1$ may be a linear or branched $C_1$-$C_{30}$ fluoroalkyl group and $R^2$ may be a hydrogen, or a linear or branched $C_1$-$C_4$ alkyl group. In formula II, $R^3$ may be a hydrogen, or a linear or branched $C_1$-$C_4$ alkyl group. Y is an anionic group. For example, Y may be a sulfite group (—$SO_3^-$) or a carboxylate (—$CO_2^-$) group. In formulas I and II, X may be, independently at each occurrence, an oxygen atom (—O—) or an —NH— group, and the values of m and n are, independently at each occurrence, an integer ranging from 1 to 5. In some embodiments, $R^4$ and $R^5$ in formula II are, independently at each occurrence, a linear or branched $C_1$-$C_{12}$ alkyl group, a $C_5$-$C_{12}$ carbocyclic group, or a $C_5$-$C_{12}$ heterocyclic group; and $R^6$ and $R^7$ are independently at each occurrence a linear or branched $C_1$-$C_{12}$ alkylene group, a linear or branched $C_2$-$C_{12}$ alkenylene group, a linear or branched $C_2$-$C_{12}$ alkylnlene group, a $C_5$-$C_{12}$ carbocyclic group, or a $C_5$-$C_{12}$ heterocyclic group. $R^4$, $R^5$, $R^6$, or $R^7$ may be substituted or un-substituted. For example, $R^4$, $R^5$, $R^6$, or $R^7$ may be saccharide which has hydroxyl substitution. In some other embodiments, $R^4$, $R^5$, $R^6$, or $R^7$ may be such at least two of $R^4$, $R^5$, $R^6$, or $R^7$ together with the nitrogen atom to which they are attached form a heterocyclic ring containing 5 to 7 atoms. For example, in some embodiments, $R^4$ and $R^5$ together with the nitrogen atom to which they are attached may form an imidazole structure. The formed heterocyclic ring may be an aliphatic ring or an aromatic ring. In some embodiments, when at least two of $R^4$, $R^5$, $R^6$, or $R^7$ are connected together along with the nitrogen atom to which they are attached may generate a substituted heterocyclic ring.

In some embodiments, a copolymer comprising 1 to 50 mole % of a structural unit of formula I and 25 to 99 mole % of a structural unit of formula II is provided. In some embodiments, a copolymer comprising 1 to 49 mole % of a structural unit of formula I and 25 to 99 mole % of a structural unit of formula II is provided. In some other embodiments, a copolymer is provided that comprises 1 to 30 mole % of a structural unit of formula I and 25 to 99 mole % of a structural unit of formula II. In some other embodiments, a copolymer comprising 1 to 29 mole % of a structural unit of formula I and 71 to 99 mole % of a structural unit of formula II is provided. In some other embodiments, a copolymer is provided that comprises 1 to 25 mole % of a structural unit of formula I and 75 to 99 mole % of a structural unit of formula II. In some example embodiments, a copolymer comprising 1 to 10 mole % of a structural unit of formula I and 90 to 99 mole % of a structural unit of formula II is provided. In any of the above embodiments, $R^1$ is a linear or branched $C_1$-$C_{30}$ fluoroalkyl group; $R^2$ and $R^3$ are independently at each occurrence a hydrogen, or a linear or branched $C_1$-$C_4$ alkyl group; X is independently at each occurrence an oxygen atom (—O—) or an —NH— group; Y is a sulfite (—$SO_3^-$) group or a carboxylate (—$CO_2^-$) group. The values of m and n are independently at each occurrence an integer ranging from 1 to 5. In some embodiments, $R^4$ and $R^5$ are independently at each occurrence a linear or branched $C_1$-$C_{12}$ alkyl group, a $C_5$-$C_{12}$ carbocyclic group, or a $C_5$-$C_{12}$ heterocyclic group; and $R^6$ and $R^7$ are independently at each occurrence a linear or branched $C_1$-$C_{12}$ alkylene group, a linear or branched $C_2$-$C_{12}$ alkenylene group, a linear or branched $C_2$-$C_{12}$ alkynlene group, a $C_5$-$C_{12}$ carbocyclic group, or a $C_5$-$C_{12}$ heterocyclic group. In some other embodiments, $R^4$, $R^5$, $R^6$, or $R^7$ are such at least two of $R^4$, $R^5$, $R^6$, or $R^7$ together with the nitrogen atom to which they are attached form a heterocyclic ring containing 5 to 7 atoms.

The structural units of formula I that contains the fluoroalkyl group impart oleophobicity and structural units of formula II that contains the zwitterionic group impart hydrophilicity to the copolymer. Thus the copolymer comprising the structural units of formula I and formula II is both hydrophiplic and oleophobic.

The carbon backbone of the fluoroalkyl groups may be linear or branched. The fluoroalkyl groups may include cyclic structures as well. It may also include one or more heteroatoms other than fluorine (e.g., nitrogen, oxygen or sulfur atom(s)). The fluoroalkyl group may be a partially fluorinated group (e.g., —$CHF_2$—) or a perfluorinated group (e.g., —$CF_3$). In some embodiments, the fluoroalkyl group may be a $C_3$-$C_{15}$ fluoroalkyl group. In some other embodiments, the fluoroalkyl group may be a $C_6$ fluoroalkyl group. Non-limiting examples of suitable fluoroalkyl groups include, but are not limited to, trifluoromethyl, pentafluoroethyl, nonafluorobutyl, tridecafluorohexyl, hexadecafluorooctyl, 2,2,2-trifluoroethyl, 3,3,3,2,2-pentafluoropropyl, 5,5,5,4,4,3,3,2,2-nonafluoropentyl, 7,7,7,6,6,5,5,4,4,3,3,2,2-tridecafluoroheptyl, 9,9,9,8,8,7,7,6,6,5,5,4,4,3,3,2,2-hexadecafluorononyl, 1,2-dihydroperfluorocyclopentane or 1,1,2-trihydroperfluorocyclopentane. In one example embodiment, the fluoroalkyl group of formula I is a tridecafluoro hexyl group.

Referring to formulas I and II, $R^2$ and $R^3$ may be independently at each occurrence a hydrogen, or a linear or branched $C_1$-$C_4$ alkyl group. For example, $R^2$ and $R^3$ may be independently at each occurrence a methyl group, an ethyl group, a propyl group, an isopropyl group, a butyl group, an isobutyl group, a secondary butyl group or a tertiary butyl group. In one example embodiment, both $R^2$ and $R^3$ may be a methyl group.

In some embodiments, $R^4$ and $R^5$ are independently at each occurrence a linear or branched $C_1$-$C_{12}$ alkyl group, a $C_5$-$C_{12}$ carbocyclic group, or a $C_5$-$C_{12}$ heterocyclic group. In some example embodiments, $R^4$ and $R^5$ may be independently at each occurrence a linear or branched $C_1$-$C_4$ alkyl group, for example, a methyl group, an ethyl group, a propyl group, an isopropyl group, a butyl group, an isobutyl group, a secondary butyl group, or a tertiary butyl group. In one example, each $R^4$ and $R^5$ is methyl group.

In some embodiments, $R^6$ and $R^7$ are independently at each occurrence a linear or branched $C_1$-$C_{12}$ alkylene group, a linear or branched $C_2$-$C_{12}$ alkenylene group, a linear or branched $C_2$-$C_{12}$ alkylnlene group, a $C_5$-$C_{12}$ carbocyclic group, or a $C_5$-$C_{12}$ heterocyclic group. In some example embodiments, $R^6$ and $R^7$ may be independently at each occurrence a linear or branched $C_1$-$C_4$ alkyl group, for example, a methylene group, an ethylene group, a propylene group, an isopropylene group, a butylene group, an isobutylene group, a tertiary butylene group. In one example, each $R^6$ and $R^7$ is methylene group.

In some other embodiments, $R^4$, $R^5$, $R^6$, or $R^7$ may be such that at least two of $R^4$, $R^5$, $R^6$, or $R^7$ together with the nitrogen atom to which they are attached form a heterocyclic ring containing 5 to 7 atoms. The heterocyclic ring formed may or may not be an aromatic ring. Further, it may be a substituted heterocyclic ring or an un-substituted heterocyclic ring. For example, $R^4$, $R^5$ may, together with nitrogen atom, form a piperidine type of structure (e.g., structure I), or $R^4$, $R^5$, and $R^6$ together with nitrogen atom may form structures such as structure II, or $R^5$, and $R^7$ together with nitrogen atom may form structures such as structure III.

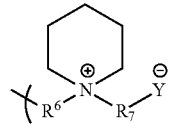

Structure I

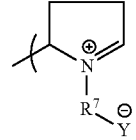

Structure II

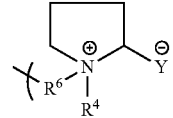

Structure III

In some embodiments, values of m and n may independently at each occurrence an integer range from 1 to 5. In some example embodiments, values of m and n may independently range from 1 to 4, 1 to 3, or 1 to 2. In one example embodiment, the value of both m and n may be 1.

In some embodiments, a copolymer comprising 1 to 50 mole % of a structural unit of formula I and 25 to 99 mole % of a structural unit of formula II is provided. The copolymer may further comprise structural units other than formula I and formula II. The maximum mole % of such other additional structural units may be derived from the formula 100−(1+25)=74. For example, in some embodiments, the copolymer may further comprise 0 to 74 mole % of additional structural units apart from the structural units of formula I and formula II. The additional structural units may be derived from a crosslinker, a structural unit that impart stability, a structural unit that further impart hydrophilicity, a structural unit that further impart oleophobicity, a structural unit that impart both hydrophilicity and oleophobicity, or a structural unit that further impart hydrophobicity. For example, in some embodiments, the copolymer may comprise 30 mole % of formula I, 69 mole % of formula II and 1 mole % of a structural unit derived from a cross linker.

In some embodiments, the copolymer comprises 1 to 30 mole % of the structural unit of formula I and 25 to 99 mole % of the structural unit of formula II. The copolymer may further comprise 0 to 74 mole % of additional structural units apart from the structural units of formula I and formula II. In some other embodiments, the copolymer comprises 1 to 29 mole % of the structural unit of formula I; and 71 to 99 mole % of the structural unit of formula II. In such embodiments, the copolymer may further comprise 0 to 28 mole % of additional structural units in addition to the structural units of formula I and formula II. In some example embodiments, the copolymer comprises 1 to 25 mole % of the structural unit of formula I and 75 to 99 mole % of the structural unit of formula II. In these embodiments, the copolymer may further comprise 0 to 24 mole % of structural units other than that of formula I and formula II.

In some embodiments, a copolymer that comprises 1 to 25 mole % of the structural unit of formula I and 75 to 99 mole % of the structural unit of formula II, is provided, wherein $R^1$ is a linear or branched $C_3$-$C_{10}$ fluoroalkyl group; $R^2$ and $R^3$ are independently at each occurrence a hydrogen, or a linear or branched $C_1$-$C_4$ alkyl group; X is independently at each occurrence an —O— or —NH—; Y is a sulfite group or a carboxylate group. The values of m and n are independently at each occurrence an integer ranging from 1 to 5. In some example embodiments, $R^4$ and $R^5$ of the copolymer may be independently at each occurrence a linear or branched $C_1$-$C_{12}$ alkyl group, a $C_5$-$C_{12}$ carbocyclic group, or a $C_5$-$C_{12}$ heterocyclic group; and $R^6$ and $R^7$ of the copolymer may be independently at each occurrence a linear or branched $C_1$-$C_{12}$ alkylene group, a linear or branched $C_2$-$C_{12}$ alkenylene group, a linear or branched $C_2$-$C_{12}$ alkylnlene group, a $C_5$-$C_{12}$ carbocyclic group, or a $C_5$-$C_{12}$ heterocyclic group. In some other example embodiments, $R^4$, $R^5$, $R^6$, or $R^7$ may be identified such at least two of $R^4$, $R^5$, $R^6$, or $R^7$ together with the nitrogen atom to which they are attached form a heterocyclic ring containing 5 to 7 atoms.

In some embodiments, a copolymer is provided, which comprises 1 to 25 mole % of the structural unit of formula I and 75 to 99 mole % of the structural unit of formula II, wherein $R^1$ is a linear or branched $C_3$-$C_{10}$ fluoroalkyl group; $R^2$ and $R^3$ are independently at each occurrence a hydrogen, or a methyl group; X is independently at each occurrence an —O— or —NH—; Y is a sulfite group or a carboxylate group. The values of m and n are independently at each occurrence an integer ranging from 1 to 5. In some example embodiments, $R^4$ and $R^5$ of the copolymer may be independently at each occurrence a linear or branched $C_1$-$C_{12}$ alkyl group, a $C_5$-$C_{12}$ carbocyclic group, or a $C_5$-$C_{12}$ heterocyclic group; and $R^6$ and $R^7$ of the copolymer may be independently at each occurrence a linear or branched $C_1$-$C_{12}$ alkylene group, a linear or branched $C_2$-$C_{12}$ alkenylene group, a linear or branched $C_2$-$C_{12}$ alkylnlene group, a $C_5$-$C_{12}$ carbocyclic group, or a $C_5$-$C_{12}$ heterocyclic group. In some other example embodiments, $R^4$, $R^5$, $R^6$, or $R^7$ may be identified such at least two of $R^4$, $R^5$, $R^6$, or $R^7$ together with the nitrogen atom to which they are attached form a heterocyclic ring containing 5 to 7 atoms.

In some embodiments, a copolymer that comprises 1 to 25 mole % of the structural unit of formula I and 75 to 99 mole % of the structural unit of formula II is provided, wherein $R^1$ is a linear or branched $C_3$-$C_{10}$ fluoroalkyl group; $R^2$ and $R^3$ are independently at each occurrence a hydrogen, or a methyl group; X is independently at each occurrence an —O— or —NH—; Y is a sulfite group or a carboxylate group. The values of m and n are independently at each occurrence an integer ranging from 1 to 5. $R^4$ and $R^5$ are independently at each occurrence a linear or branched $C_1$-$C_3$ alkyl group; and $R^6$ and $R^7$ are independently at each occurrence a linear or branched $C_1$-$C_{12}$ alkylene group, a linear or branched $C_2$-$C_{12}$ alkenylene group, a linear or branched $C_2$-$C_{12}$ alkylnlene group, a $C_5$-$C_{12}$ carbocyclic group, or a $C_5$-$C_{12}$ heterocyclic group.

In some embodiments, a copolymer that comprises 1 to 25 mole % of the structural unit of formula I and 75 to 99 mole % of the structural unit of formula II is provided, wherein $R^1$ is a linear or branched $C_3$-$C_{10}$ fluoroalkyl group; $R^2$ and $R^3$ are independently at each occurrence a hydrogen, or a methyl group; X is independently at each occurrence an —O— or —NH—; Y is a sulfite group or a carboxylate group. The values of m and n are independently at each occurrence an integer ranging from 1 to 5. $R^4$ and $R^5$ are independently at each occurrence a linear or branched $C_1$-$C_3$ alkyl group; and $R^6$ and $R^7$ are independently at each occurrence a linear or branched $C_1$-$C_5$ alkylene group.

In some embodiments, a copolymer that comprises 1 to 25 mole % of the structural unit of formula I and 75 to 99 mole % of the structural unit of formula II is provided, wherein $R^1$ is a linear or branched $C_3$-$C_{10}$ fluoroalkyl group; $R^2$ and $R^3$ are independently at each occurrence a hydrogen, or a methyl group; X is an —O—; Y is a sulfite group or a carboxylate group. The values of m and n are independently at each occurrence an integer ranging from 1 to 5. $R^4$ and $R^5$ are independently at each occurrence a linear or branched $C_1$-$C_3$ alkyl group; and $R^6$ and $R^7$ are independently at each occurrence a linear or branched $C_1$-$C_5$ alkylene group.

In some embodiments, a copolymer comprising 1 to 25 mole % of the structural unit of formula I and 75 to 99 mole % of the structural unit of formula II is provided, wherein $R^1$ is a linear or branched $C_3$-$C_{10}$ fluoroalkyl group; $R^2$ and $R^3$ are independently at each occurrence a hydrogen, or a methyl group; X is an —O—; Y is a sulfite group or a carboxylate group. The values of m and n are independently at each occurrence an integer ranging from 2 to 4. $R^4$ and $R^5$ are independently at each occurrence a linear or branched $C_1$-$C_3$ alkyl group; and $R^6$ and $R^7$ are independently at each occurrence a linear or branched $C_1$-$C_5$ alkylene group.

In some embodiments, a copolymer includes 1 to 10 mole % of the structural unit of formula I, and 90 to 99 mole % of the structural unit of formula II, wherein $R^1$ is a linear $C_5$-$C_8$ fluoroalkyl group; $R^2$, $R^3$, $R^4$, and $R^5$ are methyl groups; $R^6$ is a $C_1$ alkylene group; $R^7$ is a linear $C_3$ alkylene group; X is —O—; Y is an sulfite group; m is integer 2; and n is integer 1.

In some embodiments, a copolymer is provided, which includes 1 to 10 mole % of the structural unit of formula I, and 90 to 99 mole % of the structural unit of formula II, wherein $R^1$ is a linear $C_5$-$C_8$ perfluoroalkyl group; $R^2$, $R^3$, $R^4$, and $R^5$ are methyl groups; $R^6$ is a $C_1$ alkylene group; $R^7$ is a linear $C_3$ alkylene group; X is —O—; Y is an sulfite group; m is integer 2; and n is integer 1.

In some embodiments, a copolymer that includes 1 to 10 mole % of the structural unit of formula I, and 90 to 99 mole % of the structural unit of formula II is provided, wherein $R^1$ is a tridecafluorohexyl group (—$C_6F_{13}$); $R^2$, $R^3$, $R^4$, and $R^5$ are methyl groups; $R^6$ is a $C_1$ alkylene group; $R^7$ is a linear $C_3$ alkylene group; X is —O—; Y is an sulfite group; m is integer 2; and n is integer 1.

In some embodiments, a copolymer comprising structural units derived from a mixture of ethylenically unsaturated monomers comprising 1 to 50 mole % of fluoroalkyl monomer of formula III and 25 to 99 mole % of zwitterionic monomer of formula IV is provided. In formula I, $R^1$ is a linear or branched $C_1$-$C_{30}$ fluoroalkyl group, $R^2$ is a hydrogen, or a linear or branched $C_1$-$C_4$ alkyl group, X is either an oxygen atom (—O—) or an —NH— group and integer values of m may range from 1 to 5. In formula II, $R^3$ is a hydrogen, or a linear or branched $C_1$-$C_4$ alkyl group, X is either an oxygen atom (—O—) or an —NH— group, Y is an anionic group, and n is an integer, the value of which may range from 1 to 5. In some embodiments, $R^4$ and $R^5$ are independently at each occurrence a linear or branched $C_1$-$C_{12}$ alkyl group; a $C_5$-$C_{12}$ carbocyclic group, or a $C_5$-$C_{12}$ heterocyclic group; and $R^6$ and $R^7$ are independently at each occurrence a linear or branched $C_1$-$C_{12}$ alkylene group, a linear or branched $C_2$-$C_{12}$ alkenylene group, a linear or branched $C_2$-$C_{12}$ alkylnlene group, a $C_5$-$C_{12}$ carbocyclic group, or a $C_5$-$C_{12}$ heterocyclic group. In some other embodiments, $R^4$, $R^5$, $R^6$, and $R^7$ are selected such that at least two of $R^4$, $R^5$, $R^6$, or $R^7$ together with the nitrogen atom to which they are attached form a heterocyclic ring containing 5 to 7 atoms.

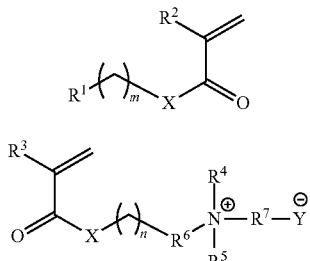

Formula III

Formula IV

The anionic group Y may be a sulfonate group ($-SO_3^-$), a carboxylate group ($-CO_2^-$), a phosphonate group ($-PO_3^-$), a borate group, a borinate group, a trifluoroboronate group, a sulfinate group, or a phosphinate group.

In some embodiments, the fluoroakyl monomer of formula I is 2-(perfluorohexyl)ethyl methacrylate (i.e., formula V).

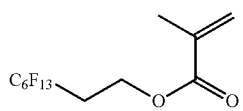

Formula V

In some embodiments, the copolymer comprises structural units derived from a mixture of ethylenically unsaturated monomers comprising 1 to 50 mole % of 2-(perfluorohexyl)ethyl methacrylate (formula V) and 25 to 99 mole % of zwitterionic monomer of formula VI.

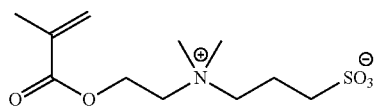

Formula VI

In some embodiments, compositions comprising the above-disclosed copolymers are provided. The composition comprising these copolymers may be employed as a coating composition to provide enhanced hydrophilicity and oleophobilcity to surfaces or matrices. Oleophobicity may be imparted by fluoroalkyl groups and hydrophilicity may be imparted by zwitterionic groups of the copolymer.

In some embodiments, a coating composition is provided, which a copolymer comprising 1 to 50 mole % of a structural unit of formula VII; and 25 to 99 mole % of a structural unit of formula VIII, wherein $R^1$ is a linear $C_5$-$C_8$ fluoroalkyl group. Here oleophobicity is imparted to the coating composition by tridecafluoro hexyl group and hydrophilicity is imparted by sulfobetaine group.

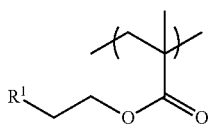

Formula VII

-continued

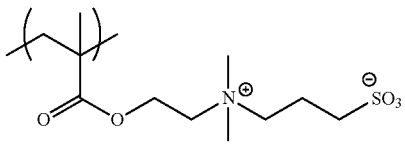

Formula VIII

In some other embodiments, copolymer of the coating composition comprises 1 to 10 mole % of a structural unit of formula VII, and 90 to 99 mole % of a structural unit of formula VIII, wherein $R^1$ is a linear $C_5$-$C_8$ fluoroalkyl group. In some other embodiments, the copolymer of the coating composition comprises 1 to 10 mole % of a structural unit of formula VII, and 90 to 99 mole % of a structural unit of formula VIII, wherein $R^1$ is $-C_6F_{13}^-$. In some example embodiments, a composition comprising a copolymer is provided wherein the copolymer comprises a structural unit of formula IX.

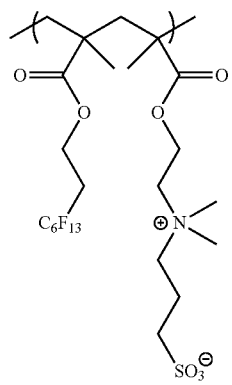

The coating composition may further comprise other agents such as solubilizing agents. Suitable solubilizing agents include, but are not limited to, surfactants, fluorosurfactants or combinations thereof. Further, the coating composition may further comprise solvents or co-solvents. Non-limiting examples of suitable solvents include hexafluoro isopropanol or pentafluorpropanol.

The hydrophilicity and olephobicity of the resulting coating composition may be optimized by optimizing the concentration of fluorine atoms in the fluoroalkyl monomer. For example, for specific water treatment applications, optimal levels of hydrophobicity, hydrophilicity and oleophobicity may be achieved by adjusting the wt % of fluorine to about 8.4%. However, other factors such as monomer structure (e.g., use of linear, branched, cyclic perfluorinated or fluorinated alkanes, or chain length) may further modify the desired hydrophilic and/or oleophobic properties of the resulting composition.

In some embodiments, membranes comprising a porous substrate and optionally a coating attached to the porous substrate is provided, wherein at least one of the porous substrate or the coating comprises any of the disclosed copolymers or copolymeric compositions. The membrane may further comprise a backing material. In some embodiments, membranes are made of the copolymer. Membranes may be made from the copolymer by using any of the membrane forming techniques (e.g., extrusion, injection molding). In some other embodiments, membranes comprise a porous substrate coated with a copolymer composition. The copolymer compositions may be disposed on the porous structures by employing any suitable coating method, for example, by roll-coating, dip-coating (immersion), or spray-coating. The membranes formed from or coated with the copolymer or copolymer compositions disclosed herein are particularly useful for removal of oily suspended solids from produced/waste water. The copolymer coating renders the resultant membrane oil-tolerant. During filtration the oil in solution will pass through the membrane and the copolymer coating prevents the oil from fouling the membrane and enables the cake of oily solids that builds up on the membrane to be easily washed off.

In some embodiments, a filtration membrane is provided that comprises a porous substrate coated with the copolymeric composition. In some embodiments, the polymeric composition comprises a copolymer comprising 1 to 50 mole % of a structural unit of formula VI, and 25 to 99 mole % of a structural unit of formula VII, wherein $R^1$ is a linear $C_5$-$C_8$ fluoroalkyl group.

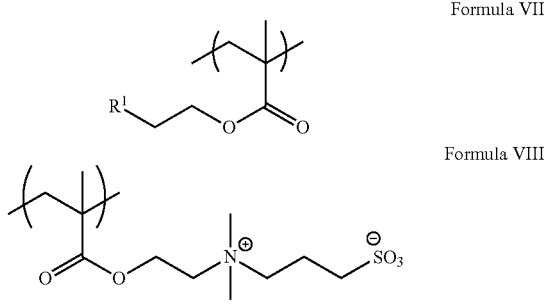

Formula VII

Formula VIII

Hydrophilicity and oleophobicity of the coated filtration membrane may be measured with respect to the contact angle between the filtration membrane and a solution. The membrane comprising the polymeric coating may have a contact angle of up to about 20° for water, and a contact angle of at least about 60° for a hydrocarbon. In one example, the filtration membrane has zero contact angle for water and 75° contact angle for hexadecane oil. These coatings may help in efficient removal of oily-solids from the hydrocarbon-contaminated solutions without pre-wetting the filtration membrane.

Due to the hydrophilicity imparted by the copolymer coating, the coated filtration membrane may be liquid permeable to a sufficient degree for filtration of aqueous liquids. Hydrophilicity allows passage of water through the membrane without the need for pre-wetting the filter with solvents such as isopropanol. Coated filtration membrane may retain water wettability and may be dried and subsequently flow liquid with no prior pre-wetting procedures. The oleophobicity imparted by the coatings prevents oils in the produced water from wetting the membrane, occluding its pores, and stopping filtration.

The porous substrate may be of a polymeric material. For example, the porous substrate may be made from polytetrafluoroethylene (PTFE), expanded polytetrafluoroethylene (ePTFE), polyolefin, polyester, polyamide, polyether, polysulfone, polyethersulfone, polyvinylidine fluoride, polystyrene, polyethylene, polypropylene, polyacrylonitrile, acrylic and methacrylic polymers, polyurethane, cellulose-based materials or combinations thereof. In one embodiment, the porous substrate is formed from ePTFE. In one example embodiment, the porous substrate is an ePTFE membrane backed with PTFE.

The porous substrate may have a pore size ranging from about 0.01 micron to about 50 micron. In some example embodiments, the porous substrate may have pore sizes ranging from about 0.01 microns to about 50 microns. In some other embodiments, the pore sizes of the porous substrate may range from about 0.1 micron to about 10 microns. In some other example embodiments, the pore sizes of the porous substrate may range from about 0.3 micron to about 2 microns.

Porous substrate may be made by any method known in the art. For example, the porous substrate may made by extruding a mixture of polytetrafluoroethylene (PTFE) fine powder particles (e.g., available from DuPont of Wilmington, Del. under the name TEFLON® fine powder resin) and lubricant. The extrudate may then calendared. The calendared extrudate may then expanded (e.g., sufficiently stretched beyond the elastic limit of the material to introduce permanent set or elongation to fibrils) or stretched in at least one direction to form fibrils connecting nodes in a three-dimensional matrix or lattice type of structure. Porous substrate may then heated or sintered to reduce and minimize residual stress in the expanded polytetrafluoroethylene (ePTFE) material. However, un-sintered or partially sintered material may also be used based on contemplated use of porous substrate. In some embodiments, the size of a fibril that has been at least partially sintered is in the range of between about 0.05 micron and about 0.5 microns in diameter, taken in a direction normal to the longitudinal extent of fibril. Other suitable methods of making a porous substrate include, but are not limited to, foaming, skiving, or casting.

In some example embodiments, membranes that comprise an expanded polytetrafluoroethylene substrate coated with the above-disclosed polymeric compositions are provided. In some embodiments, expanded polytetrafluoroethylene substrate is coated with a polymeric coating composition that includes a copolymer comprising 1 to 50 mole % of a structural unit of formula VI, and 25 to 99 mole % of a structural unit of formula VII, wherein $R^1$ is a linear $C_5$-$C_8$ fluoroalkyl group. In some other embodiments, the polymeric coating composition includes a copolymer comprising 1 to 10 mole % of a structural unit of formula VII, and 90 to 99 mole % of a structural unit of formula VIII, wherein $R^1$ is a linear $C_5$-$C_8$ fluoroalkyl group. In some other example embodiments, a hydrophilic-oleophobic membrane is made by coating an expanded polytetrafluoroethylene substrate with a polymeric coating composition that includes a copolymer comprising 1 to 10 mole % of a structural unit of formula VII, and 90 to 99 mole % of a structural unit of formula VIII, wherein $R^1$ is a linear —$C_6F_{13}$.

In some embodiments, the coating composition comprising the copolymer may be reacted with the porous substrate to form a coating disposed on at least one portion of the porous substrate. The copolymer may get bound to the porous substrate through one or more covalent bonds. Covalent bonding may help to avoid extraction of the compound from the filtration membrane into the solution being filtered. In some other embodiments, the copolymer may be coated on the porous substrate by physisorption (e.g., adsorption).

Each porous substrate may be weighed prior to coating and after coating to establish the desired amount (wt % add-on) of coating material on the resulting membrane filter. The wt % add-on may be calculated from the difference between the coated membrane weight and the uncoated membrane weight as weight-percent add-on=100*(coated membrane weight−uncoated membrane weight)/(uncoated membrane weight). The desired wt % add-on may be determined from the desired permeability of the membranes after coating, and the extent to which the physical properties of the coating have been imparted to the membrane. In some embodiments, the wt % add-on may be as high as 50% (e.g., for making ultrafiltration membranes). In some other embodiments, the wt % add-on for an un-backed membrane (e.g., porous substrate made of only ePTFE) may be as high as 20%. In one example embodiment, the copolymer may be coated on a porous substrate made of ePTFE backed with PTFE such that the coating constitute to about 0.15 wt % to about 5 wt % of the total weight of the resultant ePTFE-based filtration membrane. Such membranes may be employed for microfiltration applications.

Coating composition may be applied to the porous substrate by any suitable method, for example, by roll-coating, dip-coating (immersion), or spray-coating. The copolymer composition may be coated on to the porous substrate by dissolving it in an appropriate solvent. For example, the copolymer may be dissolved in tetrafluoro propanol or hexafluoro isopropanol and this copolymeric solution may be employed for coating the porous substrate. Coating composition may further include stabilizing agents and/or activators. The coating composition, in a suitable solvent, may be applied to the porous substrate such that the coating composition passes through the pores and wet-out surfaces of the porous substrate. At least a portion of the porous substrate including surfaces of pores may be coated with the coating composition without blocking the pores. The coating composition may be then cured by heating the porous substrate such that the copolymer flow and coalesce to form coating onto the porous substrate followed by solvent evaporation. Coatings may be made permanent on the porous substrate by virtue of either cross-linking or insolubility in produced water. In one embodiment, immersion procedure is used to coat the filtration membrane with the coating composition. The copolymer coating composition may be applied on the porous substrate at low percent loading, for example, about 0.1 to about 1 wt %, to minimize pore constriction. This may vary depending on the weight of the porous substrate as well. In some embodiments, the coating composition include about 0.2 wt % of the copolymer.

In some embodiments, the filtration membrane may additionally include a backing material. The membrane and the backing materials may be integrally joined by techniques well known in the art. Non-limiting examples of backing material include woven or nonwoven synthetic materials having the strength necessary to reinforce the filtration membrane and the ability to be integrally bound to the membrane while not interfering with the passage of permeate through the membrane. Suitable backing materials may include polytetrafluoroethylene, polyester, polypropylene, polyethylene and nylon. In one example embodiment, backing material is made of polytetrafluoroethylene.

The porous substrate coated with the copolymeric composition may be used as a microfiltration membrane or an ultrafiltration membrane. The copolymeric coating may render a microfiltration membrane oil-tolerant. By incorporating hydrophilicity and oleophobicity to a microfiltration membrane, the copolymer coatings enable filtration of oil-contaminated produced water such as is found in unconventional gas and oil production. Copolymer-coated microfilters may be employed to reject oily suspended solids such as dirt and other small particles. In the absence of such coatings, oil in the produced water (e.g., as emulsified oil) rapidly fouls the membrane and precludes economic operation. Oil-tolerant microfilters pass oil-droplets and dissolved oil without being fouled by them. The copolymeric coating may also render an ultrafiltration membrane oil-tolerant and oil-rejecting. Coated ultra-filters, being oleophobic, reject oil droplets to avoid being fouled by the oil.

Oil-tolerant, hydrophilic microfiltration or ultrafiltration membrane filters described herein have significant advantages over currently available hydrophilic, non-oil-tolerant microfiltration filters. Some of these include, but are not limited to, (a) elimination of pre-wetting the membrane with flammable solvents such as isopropanol, (b) the capability of the membrane to used effectively with a wide range of produced water compositions, (c) easier, milder and less frequent cleaning requirements, (d) Smaller footprint requirements in comparison with biocide treatment facilities, and (e) elimination of the need for toxic chemical storage and handling (e.g. biocides and solvents) in field operations, which are usually in remote locations.

In some embodiments, methods for treating contaminated water using such filtration membranes are provided. The contaminated water may be the water produced from oil-sands, coalbed methane, unconventional gas, enhanced oil-recovery, salt-water aquifers, or mining processes. The contaminated water may have oil in a dispersed phase and water is a continuous phase. For example, the contaminated water may be the produced water from the petroleum industries, the produced water in the production of conventional or unconventional natural gas, or shale gas-produced water. The contaminated water may often contain a mixture of water and hydrocarbon (e.g., oil) and may further comprise oily suspended particles and high levels of dissolved solids (e.g., dissolved salts). For example, the contaminated water may contain organic components in a range between 1 and 1000 ppm. Further, for example, it may contain free un-dissolved oil in a range between 1 and 500 ppm, dissolved solids in a range between 500 and 200000 ppm, and suspended particles in a range between 1 and 2000 ppm.

In some embodiments, a method of treating contaminated water using the above-disclosed filtration membrane is provided. The method includes the steps of providing the contaminated water comprising water and oil, providing a filtration membrane comprising the copolymeric coating described herein and passing the contaminated water through the membrane to generate treated water. For example, the contaminated water may be filtered through the membrane comprising the copolymeric coating to decontaminate the water. Upon passing through the membrane, the concentration of the suspended particles is decreased.

In some embodiments, the filtration membrane may be used for method of separating oily particles from a mixture comprising water and oil. The method includes contacting the mixture with the filtration membrane and filtering the mixture through the filtration membrane. After filtration, oily particles in the mixture may be separated by the filtration membrane and water and oil may pass through the pores. However, the oil in water may not foul the coated membrane due to its oil-tolerance. Further, the removal of cake generated by the filtered oily particles may be easily removed from the membrane due to its oleophobic characteristics. The filtration and subsequent separation may be performed under gravity.

The following examples are disclosed herein for illustration only and should not be construed as limiting the scope of the invention. Some abbreviations used in the examples section are expanded as follows: "mg": milligrams; "ng": nanograms; "pg": picograms; "fg": femtograms; "mL": milliliters; "mg/mL": milligrams per milliliter; "mM": millimolar; "mmol": millimoles; "pM": picomolar; "pmol":

picomoles; "µL": microliters; "min.": minutes, "gal": gallons "gpm": gallons per minute; "gm": grams and "h.": hours.

EXAMPLES

Example 1

Synthesis of copolymer of 2-(methacryloyloxy (ethyl)dimethyl-(3-sulfopropyl) ammonium hydroxide (SBMA) and 2-(Perfluorodechexyl)ethyl methacrylate The copolymer was prepared by the free radical polymerization of zwitterionic, [2-(methacryloyloxy(ethyl]dimethyl-(3-sulfopropyl) ammonium hydroxide (SBMA, formula VI) and 2-(Perfluorodechexyl)ethyl methacrylate (DuPont™'s fluorinated Capstone 62MA™, formula V) using 2,2'-Azobis(2,4-dimethyl)valeronitrile (Vazo-52) as an initiatior. SBMA and Vazo-42 were dissolved in 85% ethanol and 15% water. The Capstone 62MA™ monomer was added to this solution and the solution de-oxygenated and stirred for 30 minutes. The solution was then heated to about 50° C. When the reaction mixture temperature was about 50° C., the Capstone 2MA™ monomer was dissolved making the reaction mixture clear. Shortly thereafter, Vazo-52 decomposition initiated polymerization. The reaction was allowed to continue as the copolymer began to precipitate until the precipitation caused the stirring to stop. The copolymer was then separated from the unreacted supernatant, dissolved in 20 wt % in hexafluoro-2-propanol (HFIP), and precipitated in methanol. NMR showed copolymerization of both monomers and no residual unreacted monomers were found in the precipitate.

The z90 copolymer was prepared by the free radical polymerization of 90 mole % of zwitterionic SBMA (formula VI) and 10 mole % of 2-(Perfluorodechexyl)ethyl methacrylate (formula V) using 2,2'-Azobis(2,4-dimethyl) valeronitrile (Vazo-52) as an initiatior as described above.

Example 2

Coating composition comprising the copolymer of 2-(methacryloyloxy(ethyl)dimethyl-(3-sulfopropyl) ammonium hydroxide and 2-(Perfluorodechexyl) ethyl methacrylate The precipitated copolymer in Example 1 was again dissolved in HFIP to generate the coating composition. Glass chips were spin-coated with this copolymer composition and were used for contact angle measurements. The contact angles for water and hexadecane measured on these copolymer coated glass chips (by placing 1 µL of solvent) were near 0°-10°, and 75° respectively. The low water contact angle evolved over a few minutes, presumably due to surface rearrangement of the hydrophilic component of Z90 copolymer.

Example 3

Coating of ePTFE/PTFE Membrane Using the Coating Composition Comprising the Copolymer of 2-(Methacryloyloxy(Ethyl)Dimethyl-(3-sulfopropyl) ammonium hydroxide and 2-(Perfluorodechexyl) ethyl methacrylate Filtration membrane was prepared by dip-coating 2.5-inch diameter disks of 1.5 µm ePTFE/PTFE membrane in a 0.2 wt % solution of the copolymer of Example 1 in HFIP. Excess solution having copolymer composition was removed by passage through a nip roller followed by HFIP evaporation. Each treated filtration membrane was weighed prior to coating and after drying to establish the desired amount (wt % add-on) of coating material on the filter. The wt % add-on is calculated from the difference between the coated membrane weight and the uncoated membrane weight as weight-percent add-on=100*(coated membrane weight−uncoated membrane weight)/(uncoated membrane weight). The desired wt % add-on may be determined from the desired permeability of the membranes after coating. A 0.2% solution of the copolymer of Example 1 resulted in 0.15 wt % add-on to the ePTFE/PTFE membrane.

Example 4

Treatment of Contaminated Water with ePTFE/ PTFE Membrane Coated with the Copolymer of 2-(Methacryloyloxy(Ethyl)Dimethyl-(3-sulfopropyl) ammonium hydroxide and 2-(Perfluorodechexyl) ethyl methacrylate A batch of test, contaminated water consisting of 20 wt % produced water from the Utica shale play and 80 wt % from the Barnett shale play was placed in a pressurized feed vessel with a magnetic stir bar for agitation. The produced water used for these tests had approximately 600 mg/L total suspended solids. A filtration membrane coated with the Z90 copolymer of Example 1 (1.5 micron ePTFE membrane on PTFE backing) was placed in a Millipore High Pressure Filter Holder (Millipore XX4504700). The filter holder assembly was placed in a test rig comprising the pressurized feed tank, the filter holder, a mass flow meter, pressure transducers upstream and downstream of the filter holder, and a filtrate receiver tank. The filtration membrane was conditioned by pumping 300 mL 13.2 wt % NaCl solution in water through the filter at about 25 gm/min. After conditioning, the filtration membrane was placed into service with the produced water mixture. The upstream pressure was 3 bar gage, and the downstream pressure was atmospheric pressure. The system was operated in this manner until the flux rate dropped below 0.46 gpm/ft$^2$. At this point, the filtration membrane was backwashed by pumping filtrate backwards through the filtration membrane, and the sludge was drained from the filter holder feed chamber by gravity. A total of three filter-backwash cycles were completed. Same procedure was repeated with a control filtration membrane, CE-1 (1.5 µm ePTFE/PTFE membrane without Z90 copolymer coating).

The performance of the copolymer coated membrane and the control membrane is illustrated in Table 1. At a pressure differential of 1 bar, the Z90 copolymer-coated filter significantly out-performed the control filter with respect to total flux consistency (0.67 for Z90 vs. 0.19 for the control). At a pressure differential of 3 bar, for three cycles, the average cycle time for Z90 copolymer-coated filter was 39 minutes, the average flux was 1.0 gpm/ft$^2$, and the total flux consistency was 0.17. The total flux consistency is defined as the ratio of the total flux (gal/ft²) in the third cycle divided by the total flux in the first cycle. The average flux, the average cycle time, and the total flux consistency were significantly lower for the uncoated filtration membrane in comparison with the filtration membrane coated with Z90 copolymer composition of Example 1.

TABLE 1

Performance of 1.5 μm ePTFE/PTFE filtration membranes

| ΔP, bar | Example | Wt % Add-on (vs. filter weight) | Avg Flux 3 cycles, gpm/ft² | Avg Cycle Time, minutes | Total Flux Consistency: Total Flux cycle-3 (gal/ft²)/ Total Flux cycle-1 (gal/ft²) |
|---|---|---|---|---|---|
| 3 | Z90-Coated Membrane | 0.17 | 1.0 | 39 | 0.17 |
|   | CE-1 | — | 0.58 | 12 | 0.01 |
| 1 | Z90-Coated Membrane | 0.16 | 0.90 | 1.4 | 0.67 |
|   | CE-1 | — | 0.94 | 1.3 | 0.19 |

Table 2 shows the cumulative flux and cycle time results for the filters tested at 3 bar differential pressure.

TABLE 2

Cumulative flux and cycle time of 1.5 μm ePTFE/PTFE filtration membranes

| | Cycle 1 | | Cycle 2 | | Cycle 3 | |
|---|---|---|---|---|---|---|
| Filter Treatment | Cumulative Flux (gal/ft²) | Cycle Time (min) | Cumulative Flux (gal/ft²) | Cycle Time (min) | Cumulative Flux (gal/ft²) | Cycle Time (min) |
| Z90-Coated Membrane | 76.8 | 72.9 | 33.7 | 31.7 | 11.3 | 12.0 |
| CE-1 | 29.3 | 28.8 | 4.4 | 6.2 | 0.4 | 0.800 |

Throughout the specification, exemplification of specific terms should be considered as non-limiting examples. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. Unless otherwise indicated, all numbers expressing quantities of ingredients, properties such as molecular weight, reaction conditions, so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques. Where necessary, ranges have been supplied, and those ranges are inclusive of all sub-ranges there between.

The invention may be embodied in other specific forms without departing from the spirit or essential characteristics thereof. The above detailed description is exemplary and not intended to limit the invention of the application and uses of the invention. Furthermore, there is no intention to be limited by any theory presented in the preceding background of the invention or the above detailed description. The foregoing embodiments are selected embodiments or examples from a manifold of all possible embodiments or examples. The foregoing embodiments are therefore to be considered in all respects as illustrative rather than limiting on the invention. While only certain features of the invention have been illustrated and described herein, it is to be understood that one skilled in the art, given the benefit of this disclosure, will be able to identify, select, optimize or modify suitable conditions/parameters for using the methods in accordance with the principles of the invention, suitable for these and other types of applications. The precise use, choice of reagents, choice of variables such as concentration, volume, incubation time, incubation temperature, and the like may depend in large part on the particular application for which it is intended. It is, therefore, to be understood that the appended claims are intended to cover all modifications and changes that fall within the spirit of the invention. Further, all changes that come within the meaning and range of equivalency of the claims are intended to be embraced therein.

The invention claimed is:

1. A method of treating a contaminated water comprising:
providing the contaminated water comprising water and oil;
providing a membrane comprising a porous substrate and a coating attached to the porous substrate, wherein at least one of the porous substrate or the coating comprises a copolymer comprising 1 to 10 mole % of a structural unit of formula I; and 90 to 99 mole % of a structural unit of formula II,

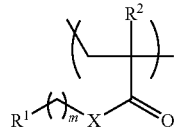

Formula I

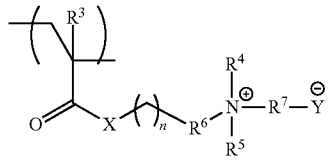

Formula II wherein
R¹ is a linear or branched $C_1$-$C_{30}$ fluoroalkyl group;
R² and R³ are independently at each occurrence a hydrogen, or a linear or branched $C_1$-$C_4$ alkyl group;
either R⁴ and R⁵ are independently at each occurrence a linear or branched $C_1$-$C_{12}$ alkyl group, a $C_5$-$C_{12}$ carbocyclic group, or a $C_5$-$C_{12}$ heterocyclic group, and R⁶ and R⁷ are independently at each occurrence a linear or branched $C_1$-$C_{12}$ alkylene group, a linear or branched $C_2$-$C_{12}$ alkenylene group, or a linear or branched $C_2$-$C_{12}$ alkynylene group, a $C_5$-$C_{12}$ carbocyclic group, or a $C_5$-$C_{12}$ heterocyclic group, or at least two of R⁴, R⁵, R⁶, or R⁷ together with the nitrogen atom to which they are attached form a heterocyclic ring containing 5 to 7 atoms;
X is independently at each occurrence an —O— or —NH—;

Y is a sulfite group or a carboxylate group; and m and n are independently at each occurrence an integer ranging from 1 to 5; and passing the contaminated water through the membrane to generate a treated water.

2. The method of claim 1, wherein the contaminated water is a produced water.

3. The method of claim 1, wherein the contaminated water comprises total organic components in a range between 1 and 1000 ppm.

4. The method of claim 3, wherein the contaminated water comprises free un-dissolved oil in a range between 1 and 500 ppm, total dissolved solids in a range between 5000 and 200000 ppm, and total suspended solids in a range between 1 and 2000 ppm.

5. The method of claim 4, wherein the concentration of the suspended solids in the treated water is lower than that of the contaminated water.

6. The method of claim 1, wherein the copolymer comprises 1 to 10 mole % of a structural unit of formula VII, and 90 to 99 mole % of a structural unit of formula VIII, wherein $R^1$ is a linear $C_5$-$C_8$ fluoroalkyl group; and

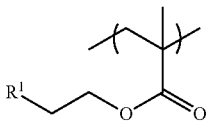

Formula VII

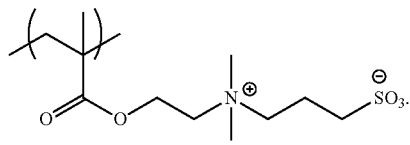

Formula VIII

7. The method of claim 6, wherein the porous substrate has a pore size ranging from about 0.01 micron to about 50 micron.

8. The method of claim 6, wherein the porous substrate comprises a polymer selected from the group consisting of polytetrafluoroethylene, expanded polytetrafluoroethylene, polysulfone, polyethersulfone, polypropylene, polyvinylidine fluoride, polyamide, polystyrene, polyethylene, polyacrylonitrile, cellulose-based materials and combinations thereof.

9. The method of claim 6, wherein the porous substrate is expanded polytetrafluoroethylene.

10. The method of claim 6, wherein the copolymer comprises 10 mole % of the structural unit of formula VII, and 90 mole % of the structural unit of formula VIII.

11. The method of claim 10, wherein $R^1$ of the copolymer is —$C_6F_{13}$.

* * * * *